Figure 1:
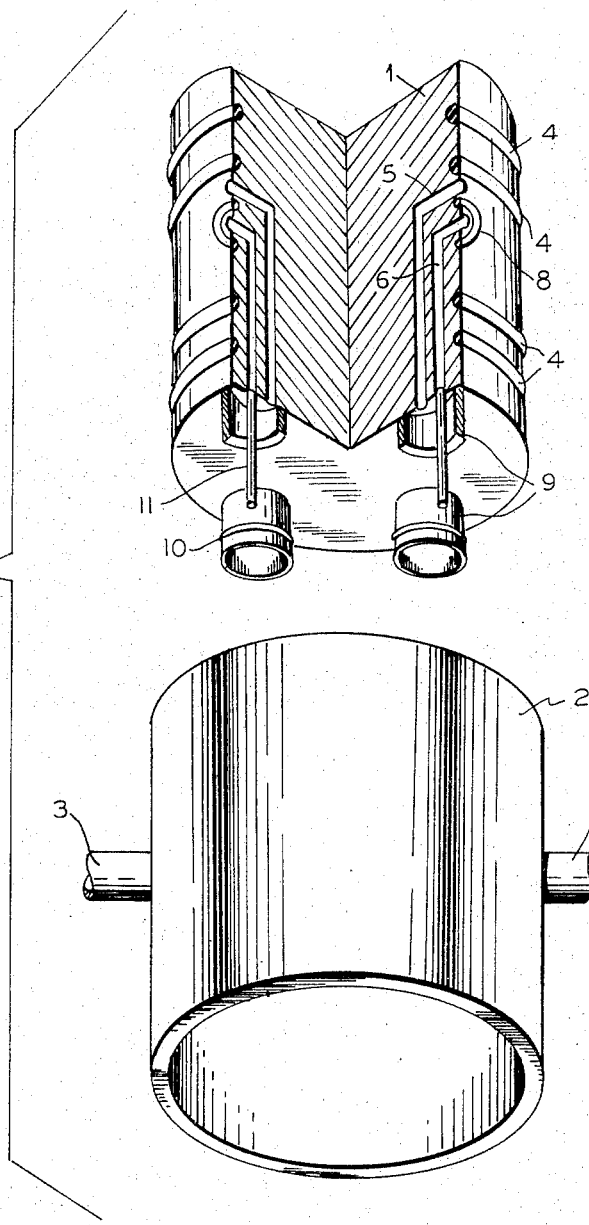

United States Patent [19]
Kunsman et al.

[11] 3,731,466
[45] May 8, 1973

[54] CONTINUOUS FLOW MULTIPLE TRAP FOR LOW TEMPERATURE REDUCED PRESSURE GAS CHROMATOGRAPHY

[75] Inventors: Chester E. Kunsman, Richard L. Coleman, both of Winter Haven, Fla.

[73] Assignee: The United States of America as represented by the Secretary of Agriculture

[22] Filed: July 14, 1971

[21] Appl. No.: 162,461

[52] U.S. Cl. ...................................................55/386
[51] Int. Cl. ..............................................B01d 15/08
[58] Field of Search................................55/197, 386

[56] References Cited
UNITED STATES PATENTS
3,630,371   12/1971   Hrdina.............................55/386 X

OTHER PUBLICATIONS
"Collection Unit For Gas–Liquid Chromatography Under Reduced Pressure." by Craig, B. M., Mallard, T. M. and Hoffman, L. L. in Angl. Chem. 31 (27 pp. 319–320 (1959).

*Primary Examiner*—John Adee
*Attorney*—R. Hoffman et al.

[57] ABSTRACT

A continuous flow multiple trapping system has been designed for reduced pressure, low temperature gas chromatographic analysis. This device allows many samples to be collected without breaking the flow of carrier gas through the detector. It was specifically designed to operate under reduced pressure. Reduced pressure GLC will allow the sample mixtures to be resolved at lower temperatures, thus avoiding thermal rearrangement caused by relatively high temperature GLC separations.

1 Claim, 2 Drawing Figures

INVENTORS
CHESTER E. KUNSMAN
RICHARD L. COLEMAN

BY R. Hoffman
ATTORNEY

CONTINUOUS FLOW MULTIPLE TRAP FOR LOW TEMPERATURE REDUCED PRESSURE GAS CHROMATOGRAPHY

A non-exclusive, irrevocable, royalty-free license in the invention herein described throughout the world for all purposes of the United States Government, with the power to grant sublicenses for such purposes, is hereby granted to the Government of the United States of America.

This invention relates to a gas chromatography device. More specifically, this invention relates to a trap for low temperature, reduced pressure, gas chromatography device. This device prevents the potential breakdown of compounds by not subjecting these to high temperatures and pressures. There is less molecular alteration either by thermal decomposition or by thermal rearrangement when the continuous flow multiple trap of this invention is used with low temperature reduced pressure gas chromatographs.

The main object of the invention is to bring about the efficient trapping of chemical components as they leave the exit port of a reduced pressure gas chromatograph.

A "gas chromatograph" is generally described as a device into which a mixture of chemical substances is injected to bring about a separation of chemical components.

In using the chromatograph the apparatus has been operated in this manner. The sample to be analyzed is placed into the inlet port by means of a syringe into a small chamber, usually a glass chamber, which is in turn located within a heating element. A syringe is used in order to facilitate the placement of the liquid sample through a rubber septum and into the small chamber. The aperture serves as a valve as well as an inlet port. The sample being analyzed ordinarily is a mixture and is vaporized in the high temperature glass or metal chamber. The vapor thus produced in the chamber is then propelled into a chemically treated column by an inert "carrier gas," such as nitrogen. The column contains packing which provides an extended surface to the inside of the column wherein the affinity of the various functional groups in the chemical sample for the active sites in the packing of the column causes either rapid or slow movement through the column thereby causing a separation of components. As the components come off the column they must pass through a detector block.

One type of detector block would be a thermo-conductivity cell which causes a response on a recorder for each component of the sample being analyzed as it passes through the thermo-conductivity cell.

In general, there are two types of chromatographs in the market, the one being for analyses and the other a preparative tool. The present invention deals with the latter type. The chemical components in this type are propelled out of the column and into a trapping system. In the process of investigation we have made novel advances in this area.

We find that gas chromatographs, with few exceptions, are made to function employing positive pressure carrier gases at about 50 pounds and temperatures of about 250°C, these figures applicable to the vaporization chambers and the detectors. The column temperature is generally maintained at about from 50° to 230°C, depending on the variables of operations.

Researchers have determined that many compounds can be molecularly altered by thermal decomposition or thermal rearrangement as well as by the activity of certain materials employed as packing material for the column. This is more pronounced when relatively high temperatures and pressures of the normal techniques are employed.

New techniques have now been employed wherein the task is performed using lower temperatures. Less thermal decomposition and rearrangement have been noted because of the reduced pressure which have been correlated to the reduced temperatures, and in this manner the chemical reactivity within the column has been lowered. This new reduced pressure technique, however, has now presented a number of problems in regard to the collection system.

It is the main object of this invention to overcome the problems associated with the collection systems of reduced pressure, reduced temperature preparative chromatographs.

PRIOR ART

The positive pressure gas chromatograph has been used since approximately 1952 and many trapping systems have been developed. A small leak can be tolerated when positive pressure is employed because the make-up of the carrier gas would be unchanged. A simple capillary tube can be used as a trap at the exit port, and the sample is condensed in the capillary tube. A leak worthy of consideration generally has been detected due to the loose fit between a capillary tube and the nozzle of the exit port. Sometimes a "lure-loc" and needle arrangement can be used. After a period of time the "lure-loc" will leak due to a buildup of compounds along its contact surfaces or because of scratches on the surfaces during normal use.

Leakage under reduced pressure likewise is not without effect of consequence. This leakage causes interference with the flow of the carrier gas and causes changes in the composition of the carrier gas. In turn, this causes considerable fluctuation in the recorder therefore unreliability of the entire system.

Currently "Micro-Waves" are being used for switching flow without interrupting the constant flow. These are ideal multi-trapping valves under positive pressure, but these micro-switching valves are generally made up of polished surfaces using Teflon as a bearing upon which they move. Under reduced pressure the Teflon tends to swell or flow into the passages of the valve and creates havoc with the flow and consequently, with the bridge and recording systems.

Use of reduced pressure gas chromatography has only recently become of interest since about 1958 when a few publications about its use first appeared. These publications contained only one idea for trapping materials separated by the reduced pressure gas chromatograph. It was a clumsy high temperature device for collecting two large samples. Its selective valve was a stockcock which would interrupt the flow of carrier gas and cause an unbalance of the bridge. The most recent publication (1969) had no trapping system at all other than a liquid nitrogen trap used to protect the vacuum pump.

The present invention is "a continuous flow multiple trap system," a device useful in low temperature, reduced pressure gas chromatography. Oversimplifying the description of this invention, it could be said that it consists of a rigid cylinder of such design as to fit into a second rigid cylinder. The one is a cylindrical solid while the other is a hollow cylinder. Both of these are provided with channels cut into them so that high pressure O rings would fit into them and serve two purposes. Leakage is prevented and rotation is permitted of the one cylinder within the other in such a manner as to permit gases to pass from the exit port of a gas chromatograph into open channels and individual traps selected by the user. The device, the trip, is designed specifically for use under high vacuum and reduced pressure gas chromatograph apparatus without disrupting carrier gas flow nor allowing noticeable leakage to occur during the collection of the fractionated samples or while changing traps.

PRINCIPLES OF THE DESIGN OF THE NEW INVENTION

The particular trapping system illustrated by a preferred embodiment (FIG. 1) has four traps comprising four nipples, each of which is lines with a single O ring between its groove and the glass tube's outer wall. There are four rather small O rings which ride on the input port of the inner cylinder and press against the inner wall of the outer cylinder. This passage is aligned so that the flow from the GLC is channeled to the trap through these small O rings, or it is open to the general vacuum chamber between larger O rings (a cylindrical chamber).

The flow of carrier gas and sample from the GLC enter the trapping system through a Swagelock fitting. Once the trap has been selected for collecting the individual sample the inner cylinder is made to revolve until the small O ring fits directly between the exit port from the GLC and the entrance to the selected trap. The vacuum pulls the sample through the passage perforation in the inner cylinder, through the "directing needle," and into a liquid nitrogen-cooled glass trap.

The sample condenses on the sides of the glass receptacles. The carrier gas flows back up the tube into and through a channel which returns to a general vacuum chamber between the two larger inner O rings around the inner cylinder.

This trapping system, designed for reduced pressure gas chromatography, can be used with as many collection traps as desired. The size or volume of capacitance can be made to fit specific needs. The number of traps as well as the trap size can be varied. A mechanical device can be adapted to change traps. The trapping system can be cooled or heated within the limits of the O rings, to satisfy the needs of the analyst. It should be pointed out that although this trap was designed for a reduced pressure manner of operation it can well be used on a positive pressure gas chromatograph, even though the positive pressure gas chromatograph does not need a rigorous trapping system.

FIG. 1 is a perspective view of the trapping device, showing the outer structure, basically a hollow cylinder, and the inner structure, basically a cylindrical rod. The outer structure has an inlet port and an outlet port protruding outwardly at about 180° from each other's position. The inner structure, a solid, has a plurality of channels drilled at selected points, which points would align with the inlet and outlet ports of the outer structure upon rotation when assembled, the one into the other cylinder structures. The inner structure has four smaller tubular projections protruding downward; these have been installed at specific sites to align with the channels.

Note that the view of the cylindrical rod is presented with a quarter section removed so that certain details can be seen . . . details which would not be obvious in a ordinary perspective view.

A general description of the device can be acquired in the following description of the pertinent details of its use. Column effluent is drawn from the GLC detector into the entry port 3, of the trapping system. The inner (solid) cylinder 1 is rotated within the outer cylinder so that a small O ring 8 forms a passageway between the effluent canal 6 and entrance port 3 on the outer cylinder 2. The sample is drawn down the effluent canal 6 through hypodermic needle 11 and into a glass collection vessel 12 (not shown) where the sample is condensed. The carrier gas will pass through the vacuum canal 5 into the space between the large O rings 4 and out the exit port 7 to the vacuum pump.

Medium O rings 10 hold the vacuum around the collection tubes 12. The inner cylinder 1 and the collection tube nipples 9 all have grooves into which their respective O rings fit. The depth of these grooves is listed in the body of the specification. The central piece, the inner cylinder 1 can be rotated to bring other tubes (not shown) into position when needed, so that other samples can be collected.

BRASS MODEL FABRICATED

The dimensions of a brass model fabricated to ascertain that all facets of the novel idea were thoroughly functional are as follows. The height of the outer cylindrical structure was about 2 in., the outside diameter about 3 in., and the inside diameter was made 2 5/16 in. at the upper end and made to taper in a distance of ⅛ in. from the top to about 2¼ in., which diameter was maintained the rest of the way down. An inlet port, 5/16 in. threaded diameter, was drilled horizontally four-fifths of the way into the outer cylindrical structure, at which point it was made to taper rapidly to an opening of about one thirty-second in. A similar outlet port was made radially 180° from the other. The inlet port is located about 1 ¼ in. from the top edge while the outlet port is located about 1⅛ in. from the top edge. This arrangement was necessary so that the flow of gases would go into a circular chamber formed by the complementary outer arrangements of the inner cylindrical rod structure.

The height of the inner cylindrical rod structure was fabricated so as to measure 2⅛ in. and further extended by the height of four nipples, tubular in structure, protruding downwardly 3/4 in. to give an overall height of about 2¾ in. The nipples were made of a ¾ in. outside diameter material which had a 5/16 in. diameter, but this was the available material and need not be so constructed. Grooves were machined at about 3/16 in. and again at ½ in. from the ends of the cylindrical rod, making a total of 4 grooves into which O rings 3/6 in. thick were inserted, thus providing a tolerance between the outer and the inner cylindrical structures (a cylindrical chamber) of about from 1/16 to 1/32 in. and about 1 in. in height. Grooves were also machined on the inside of the nipples of our brass model, but experience has indicated that it might be wiser to have the grooves on the outside of the nipples, because a broken glass receptacle would be easier to remove from the outside arrangement.

The clearance afforded by the 1/16 in. tolerance provided sufficient compression of the O rings to prevent the gas leakage that might occur at the chamber; simultaneously this arrangement provided a bearing surface for rotation of the one structure within the other once the O rings were lubricated with silicone grease.

While the outer cylinder comprises an inlet and an outlet port for the flow in and out of gases the inner cylindrical rod comprises four pairs of ports to complement these inlet and outlet ports. The ports of the inner cylindrical rod structure lead into horizontal chambers directed toward the vertical axis of the rod. Each pair of channels would be 90° with respect to the adjacent pair of channels, and positioned one above the other rather than side by side. The lower port, which leads to the lower channel, was made the inlet port. The upper port leads to the upper channel and is designed as the outlet port. Each of the inlet channels was drilled to a depth of about 7/16 in., while each of the outlet channels was drilled to 9/16 in. depth, at which point each of the horizontal channels was met by a vertically oriented channel which extends down and out through the center of each nipple. The particular design of this brass model was made to handle 4 samples therefore there are four symmetrically positioned nipples protruding downward from the lower extremity of the inner cylindrical rod. Each nipple circumscribes the openings of a pair of channels, the inlet channel opening vertically outermost and containing a capillary-sized extension of about 1½ in. length. There is a distance of about 3/16 in. between horizontal channels and a similar distance between vertical channels. Each of the inlet ports is circumscribed by a circular groove recessed into the outer surface of the cylindrical rod so as to accept a ¼ in. O ring. The purpose of these O rings is to prevent the gases from going anywhere other than into the inlet channel, then downward into the receptacle which is then cooled by a chilling liquid nitrogen bath.

Figure 2:
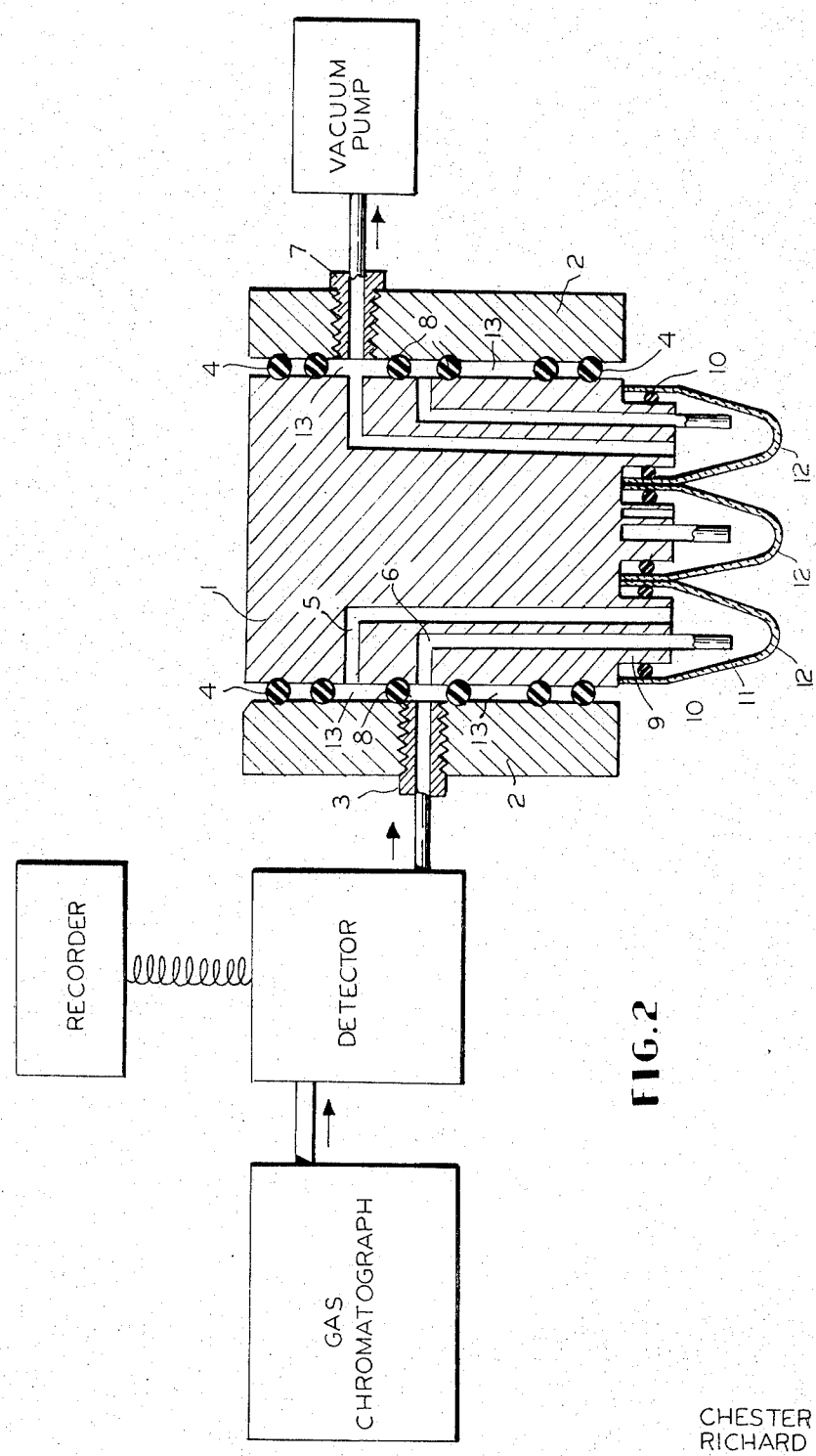

The assembled trap was designed to operate with all receptacles in place, this particular model being designed to collect four prepared samples in the four receptacles which fit into the four nipples. The brass model was provided with means for connecting the trap between a detector and a vacuum pump, as seen in FIG. 2, and means for supporting the weight of the brass model. The particular model described above weighed 2.18 kg., without the glass receptacles.

The brass working model was specifically designed so that the gases would enter the cylindrical chamber at an inlet port, shown in FIG. 2 as number 3, through the cylindrical chamber 13, and out the exit port 7, which happens to be shown in FIG. 2 as being 180° around the periphery of the outer structure and at a higher point. This simply makes the tubing connections "directly in line" when viewed from the top, and "horizontal but not in line" when viewed in an elevation view. This specific model has other ports at 90° from ports 3 and 7. That would be obvious from the illustration of FIG. 1. One modification that could be made is the installation of the exit port 7 at 90° from inlet port 3 on the outer cylinder.

This particular model was designed to function in a system where bypass valves permitted the removal of the four samples trapped. Another arrangement tried with success was installing valves to break the vacuum momentarily for effecting a change of trap. None of these modifications alter the crux of the invention. These modifications simply allow the removal of samples taken one at a time or all at once, dependent upon the individual researcher's needs.

The brass model thus built is merely an illustration of one working model. Modification can be made without violating the principles involved, thus covering the idea of this invention.

We claim:

1. A continuous flow multiple receptacle trap for gas chromatographs which analyze chemicals at reduced pressures and lower temperatures, the trap comprising these component parts assembled to function as a unit:

a. an outer cylindrical structure having two openings for tubular projections to be inserted thereinto, the one opening positioned so as to be about 180° to the other, the one opening being a fraction of an inch higher than the other; the outer cylindrical structure having a smooth inner surface against which O rings of the outer surface of the cylindrical rod come in contact with; the outer cylindrical structure having a gentle taper at the upper inside end to permit the insertion of the O ringed cylindrical rod therein without the dislocation of the O rings, and b. a cylindrical rod dimensionally complimentary to the outer cylinder of (a) to fit thereinto when assembled; the dimensions being such as to provide a clearance for rotation of the one inside the other; the cylindrical rod having two sets of circular grooves near the extreme ends, on its outer surface wherein a substantially leak-proof, pivotal contact is made between (a) and (b) through the O rings which fit thereinto; the cylindrical rod provided with a plurality of symmetrically spaced, downward-protruding nipples, each of which would have an axis parallel to the axis of the cylindrical rod, and each nipple being tubular and circumscribing two relatively small opening, the outer opening being provided with an extension in the form of a capillary-size tube which protrudes downward beyond the open end of the nipple; said openings being the lower end of vertically parallel channels running upwards about two-thirds of the axial length of the cylindrical rod wherein each pair of channels is met by a pair of horizontally connecting channels, said horizontal channels being perpendicular to the axis of the cylindrical rod; the open end of said horizontal channels providing an inlet and an outlet port, the inlet port being circumscribed by a small groove which accommodates a small O ring which seals the channel from the inlet port of the cylindrical rod; said outlet port to open immediately above the inlet port of the cylindrical rod, and thereby empty its gaseous contents when in operation into the cylindrical chamber which is formed by the inner surface of the outer cylindrical structure of (a), the outer surface of the cylindrical rod of (b), and the O rings; said cylindrical chamber designed to evacuate its gaseous contents when in operation through the outlet port of the outer cylindrical structure of (a), said outlet port being at a higher level than the inlet port which is 180° from said outlet port.

* * * * *